US006704774B2

(12) United States Patent
Terranova

(10) Patent No.: US 6,704,774 B2
(45) Date of Patent: *Mar. 9, 2004

(54) CONTENT PREFERENCE SYSTEM AT RETAIL OUTLET

(75) Inventor: Steven N. Terranova, Cary, NC (US)

(73) Assignee: Gilbarco Inc., Greensboro, NC (US)

(*) Notice: Subject to any disclaimer, the term of this patent is extended or adjusted under 35 U.S.C. 154(b) by 193 days.

This patent is subject to a terminal disclaimer.

(21) Appl. No.: 09/398,137

(22) Filed: Sep. 17, 1999

(65) Prior Publication Data
US 2002/0165780 A1 Nov. 7, 2002

(51) Int. Cl.[7] .............................................. G06F 17/21
(52) U.S. Cl. ............................ 709/219; 705/27; 705/1; 709/231; 707/10
(58) Field of Search ...................... 705/14, 58, 61, 705/27, 1, 26; 700/231, 413; 707/10; 235/381; 709/217–219, 231

(56) References Cited

U.S. PATENT DOCUMENTS

| | | | |
|---|---|---|---|
| 4,804,937 A | | 2/1989 | Barbiaux et al. |
| 5,072,380 A | | 12/1991 | Randelman et al. |
| 5,204,819 A | | 4/1993 | Ryan |
| 5,327,066 A | | 7/1994 | Smith |
| 5,422,624 A | | 6/1995 | Smith |
| 5,493,315 A | * | 2/1996 | Atchley ....................... 235/381 |
| 5,499,181 A | | 3/1996 | Smith |
| 5,546,523 A | | 8/1996 | Gatto |
| 5,633,484 A | * | 5/1997 | Zancho et al. .............. 238/380 |
| 5,705,798 A | | 1/1998 | Tarbox |
| 5,717,374 A | | 2/1998 | Smith |
| 5,742,229 A | | 4/1998 | Smith |
| 5,806,018 A | | 9/1998 | Smith et al. |
| 5,859,416 A | | 1/1999 | Gatto |
| 5,864,823 A | * | 1/1999 | Levitan ....................... 705/14 |
| 5,913,040 A | * | 6/1999 | Rakavy et al. .............. 370/229 |
| 5,914,654 A | | 6/1999 | Smith |
| 5,987,466 A | * | 11/1999 | Greer et al. .................. 707/10 |
| 6,014,638 A | * | 1/2000 | Burge et al. ................. 705/27 |
| 6,018,293 A | | 1/2000 | Smith |
| 6,061,659 A | * | 5/2000 | Murray ....................... 705/14 |
| 6,098,879 A | * | 8/2000 | Terranova .............. 235/380 X |
| 6,230,199 B1 | * | 5/2001 | Revashetti et al. ....... 705/14 X |
| 6,317,761 B1 | * | 11/2001 | Landsman et al. .......... 707/513 |
| 6,360,137 B1 | * | 3/2002 | Royal, Jr. et al. ........ 705/26 X |

OTHER PUBLICATIONS

"Now Even Gas Pumps Have Net Content," Wall Street Journal Interactive, Aug. 17, 1999 (http://www.zdnet.com/zdnn/stories/news/0,4586,2315620,00.html).

* cited by examiner

Primary Examiner—Richard Chilcot
(74) Attorney, Agent, or Firm—Withrow & Terranova PLLC

(57) ABSTRACT

A retail establishment providing user access to the Internet or other information providing sources includes software which allows uses to indicate preferences of which content providing sources should be accessed, in which order and for how long. In this manner, the user is allowed to preselect content to which he or she will be exposed. The selection may occur at an initial registration time or during the retail transaction. The software is especially adapted for use in a fueling environment. The software includes additional features such as printing and allowing a user to access the content from inside a car.

61 Claims, 10 Drawing Sheets

CONTENT PREFERENCE SYSTEM AT RETAIL OUTLET

FIELD OF THE INVENTION

The present invention pertains to a system and resident software, which provide preselected content to a user at a retail outlet such as a fuel dispenser.

BACKGROUND OF THE INVENTION

The Internet is the child of the Advanced Research Projects Agency Network (ARPAnet), an idea of the Department of Defense to assist in shared research efforts and to enable dispersed communications even in the event of localized failures of nodes within the communications network such as might occur in a nuclear war. Since its creation, the Internet has evolved and been co-opted, first by educational institutions not involved with the original ARPA grants, and then by commercial entities, resulting in a product which only vaguely resembles the original ARPAnet.

One of the innovations which has fueled an explosion of the usage of the Internet has been the development and promotion of the World Wide Web. In contrast to prior user interfaces such as gopher and File Transfer Protocol, the World Wide Web, and its hypertext format, allows the retrieval and manipulation of diverse data sources including listening to audio files and viewing graphical images and video clips. Furthermore, the interface is comparatively user friendly, allowing access to different information sources with the click of a button. In addition to the Internet proper, there are also many proprietary information providers which act as gateways as well as providing their own content. These may be formal gateways such as AOL® or COMPUSERVE® wherein the user logs in and is not immediately viewing a World Web address, or they may be simple Internet Service Providers who also provide a web home page having its own content. Examples of this sort of Internet Service Provider include Microsoft Network Services™ (MSN), BELLSOUTH™, GTE™ and the like.

The explosion of the Internet is, in effect, a self-perpetuating cycle. As more people use the Internet, and specifically the World Wide Web, more service providers create presences on the Internet, providing diverse services. As more service providers create presences on the Internet, more people are inclined to use the Internet because of the myriad information sources contained thereon. While some content providers are selling goods and services, others are providing information such as news reports, weather reports or the like. All of these content providers together lure many people to the Internet every day.

In addition to the numbers of users of the Internet and its gateways spiraling upward, the extend of their usage is also spiraling upward. Once a person realizes the simplicity and functionality of the Internet, there is a pronounced tendency to log in ever more frequently so as to not miss something, or simply to stay in touch. News is available through numerous news sources such as cnn.com or msn.com, both of which provide continually updated news on their respective web pages.

However, there are frequently times and places where people cannot access the Internet, or access is so time limited that even the simple point and click manipulations of the World Wide Web are too cumbersome to retrieve and view the desired content in the time available. One of the primary places where these constrains come into play is during retail transactions, especially at fuel dispensing environments, where there is frequently inefficiently used time during the fuel dispensing operation. This time could be spend viewing content, but there is presently little or no Internet or other information provider access for the user from the fuel dispenser. Two examples of efforts to provide such access to a fuel dispensing environment are seen in commonly owned U.S. patent applications Ser. Nos. 08/896,988, filed Jul. 18, 1997 and 09/024,742, filed Feb. 17, 1998, which are herein incorporated by reference.

Additionally, the length of time of an average fueling transaction is not conductive to switching between multiple web pages through a manual interface to find exactly the content desired. Thus, where access to the Internet is possible, the efficient delivery and viewing of the content thereof is difficult to manage.

SUMMARY OF THE INVENTION

The solution to the lack of Internet and preferred information access at retail establishments is to provide such access through a retail establishment terminal, preferably a fuel dispenser or customer focused point of sale (POS). Furthermore, the present invention addresses the need to economize the time during the retail transaction available by providing user selected content preferences, which control what content is displayed on the retail establishment terminal for viewing by the user. Not only are the content preferences designed to allow immediate access to preferred content providers, but also the preferences are designed to control viewing parameters, such as viewing time, of the content providers.

The user initially logs in to his account host, whether it be AOL®, MSN™, or similar remote information provider, from any terminal with such access and creates a set of content preferences. The content preferences indicate the source and location from which the content is to be retrieved. The preferences are saved in memory.

Retail establishments must have an Internet ready system, which is capable of connecting a POS terminal or device to the Internet. It is particularly desirable to make fuel dispensers directly or indirectly Internet capable. Subsequently, the user arrives at a retail establishment and uses a retail establishment terminal to access the account host a the Internet in general. The user then accesses the preferences, which dictate the content displayed on the retail establishment terminal. Preferably, access is automatically initiated at the beginning of a transaction upon identifying a user through a card, transponder or the like.

The present invention provides a system which allows the above described communication connections to be made while implementing software which allows the user not only to create the preferences, but also to retrieve and implement them such that the user only sees the desired content for the desired amount of time.

In the preferred embodiment, the user initially logs in to an account host associated with the Internet and sets preferences including from where content or information is retrieved. Included in the preferences are time limits and instructions to switch automatically between different content providers. Subsequently, the user logs on to the World Wide Web or a proprietary gateway through a retail point of sale interface. After successfully logging on, the user may view information from preselected content providers for preselected amounts of time without the need to change manually a Uniform Resource Locator (URL) or use a mouse to click on a hypertext link. The need for manual prompting is eliminated by the preference program automatically switching between content providers as previously indicated by the user. In this manner, the user can have access to desired content in a retail environment. The user also has the freedom to dispense fuel or otherwise conduct a retail transaction, without the need to change manually content providers so as to view all the desired content within a short amount of time.

Subsequently, the user arrives at the retail establishment and alerts a terminal that the user desires to access content. The retail POS logs into the account host and access the preferences. The account host retrieves information from the preferred content providers and sends the information to the POS for display by the POS or for downloading to a user controlled computer.

DETAILED DESCRIPTION OF THE PREFERRED EMBODIMENT

The present invention lies in adapting retail establishment computers and Point Of Sale (POS) terminals to retrieve information from a remote source for delivery to consumers in the retail establishment. This is particularly implemented with software which stores preselected user preferences defining content to retrieve, or the source from which content should be retrieved. The software is preferably adapted to store a time limit, which limits the time the content is provided and allows automatic switching between different content providers without the need for manual intervention. Because the content providers are typically remote from the consumer and the retail establishment, network connections are provided to allow the content and information to be transferred from the content provider to the retail establishment computer for viewing by the consumer. The user should have a number of different locales from which the preferences can be selected, and the software is further adapted to provide a user friendly interface, which facilitates the entry of preferences. Notably, the locales where preferences are defined may be remote from the retail establishment or POS, such as from a personal computer or computing device. Hand held and vehicle based computing systems are specifically included in this group.

Figure 1:
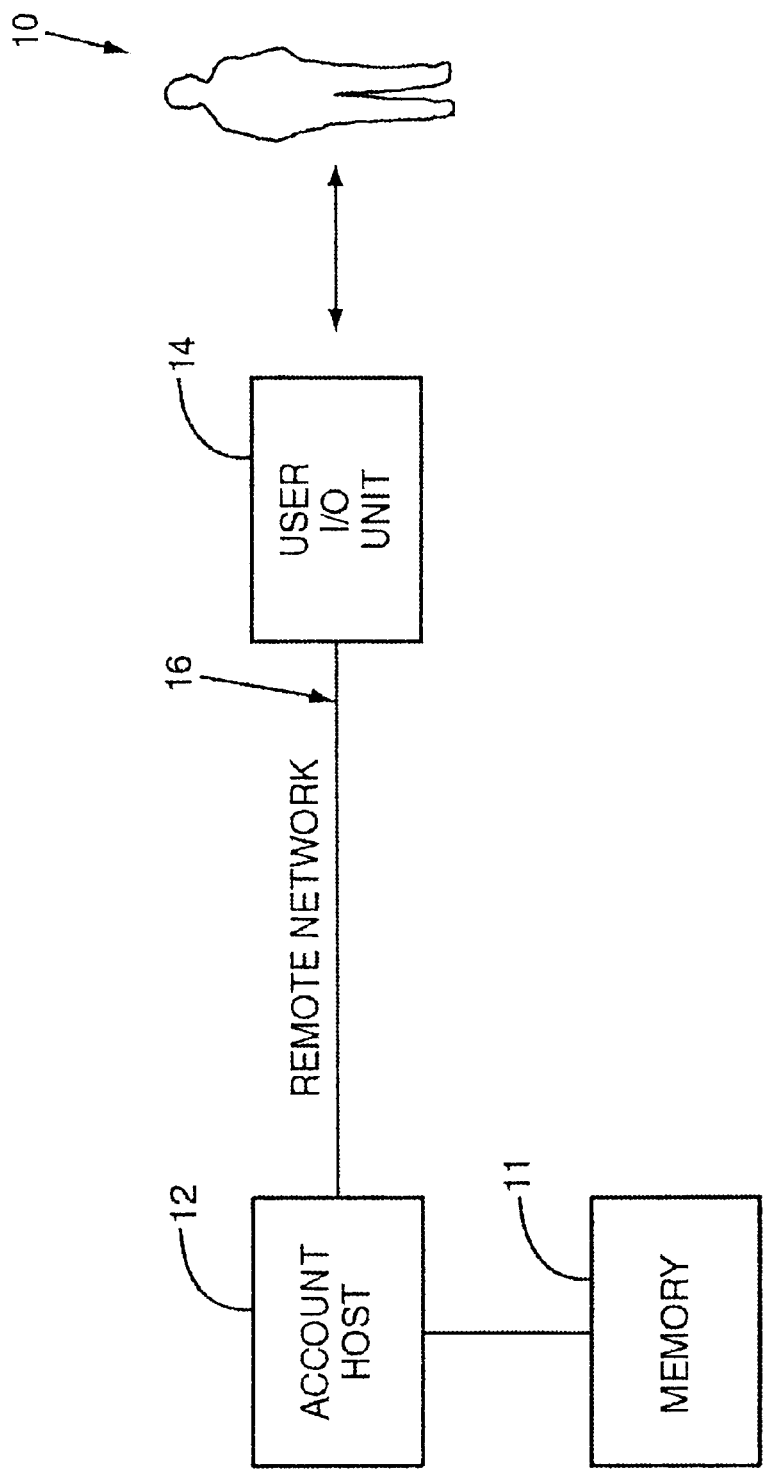
FIGS. 1–3 are schematic drawings showing example network configurations.

Turning now to the drawings, a basic network is shown schematically in FIG. 1. A user 10 accesses content from an account host 12 through a user input/output unit (UIU) 14. As noted, the UIU 14 may be a conventional personal computer and may include an input device such as a mouse, a keyboard, a touch screen or the like and an output device such as a monitor, video or CRT (not shown). The access to the account host 12 is accomplished by a conventional network 16, which may be the Internet, a dedicated telephone line, a wireless connection or the like. The only requirement for the network 16 is that content from the account host 12 can be passed or downloaded to the UIU 14 for access by the user 10. In general, the present disclosure will speak in terms of "viewing" and "displaying", however, it should be understood that the terms should be interpreted liberally and include activities such as listening to an audio file, watching a video clip or the like so long as content or information is conveyed from the account host 12 to the user 10.

The account host 12 can be as simple as a server with a web page, an electronic local bulletin board, a proprietary account host 12 such as AOL®, COMPUSERVE® or the like. The account host 12 provides consumers, such as the user 10, individual accounts for logging in to access proprietary information, the Internet, or other services such as email accounts. Information about the account is stored in a memory unit 11. Additionally, content for display by the account host 12 may also be stored in the memory unit 11. The user 10 can access his or her particular account with a user ID and a password or other identifying criteria from any type of UIU 14 so long as the UIU 14 is able to access the account host 12, either directly or indirectly. Acceptable UIUs 14 include home personal computers, laptops, personal digital assistants, hand-held or vehicle based computing units, retail computers, or Internet capable kiosks. It is also possible that another person, such as a retail employee, could enter information into the UIU 14 and retrieve information for display to the consumer.

Figure 2:
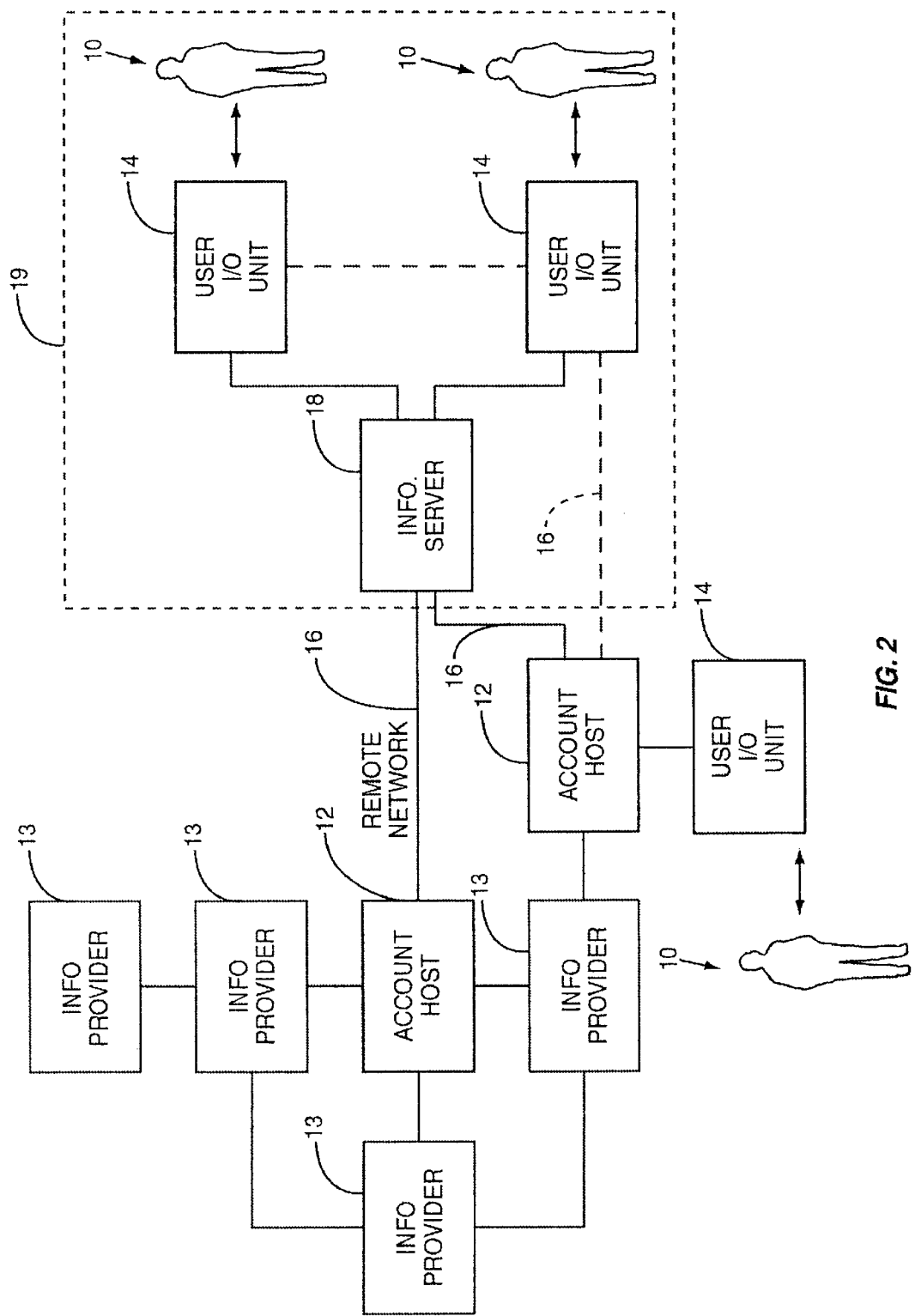

A more complex network is seen in FIG. 2, wherein multiple users 10 using multiple UIUs 14 access content or information from different account hosts 12. Additionally, access to one account host 12 may allow subsequent access to other information providers 13 or even other account hosts 12. For example, the user 10 may log in to his BELLSOUTH™ account at a first account host 12, and then check out cnn.com which is an information provider 13 with the assistance of a web browser such as NETSCAPE NAVIGATOR™ or INTERNET EXPLORER™. The user 10 could also access the GTE.net site, which also acts as an account host 12 for different people, while providing its own content. Another example would be logging in to the account host 12 at AOL.com, and then passing through AOL to reach the cnn.com site. Some users 10 are using UIUs 14, which are part of a retail establishment 19 and perhaps integrated in a POS terminal.

The network of FIG. 2 further differs from the simple network of FIG. 1 in that an information server 18 is positioned between certain ones of the UIUs 14 (particularly the ones that are part of the retail establishment 19) and the account hosts 12 and other information providers 13. It should be noted that the UIU 14 could also bypass the information server 18 by a direct connection 16 (shown in dotted lines). Network connections 16 again provide the means by which the content or information travels from the account hosts 12 to the information server 18 or the UIU 14. The information server 18 manages the requests from the UIUs 14 and routes them to the appropriate account host 12. The information server 18 also receives information from the account hosts 12 and routes it to the appropriate UIU 14.

Figure 3:
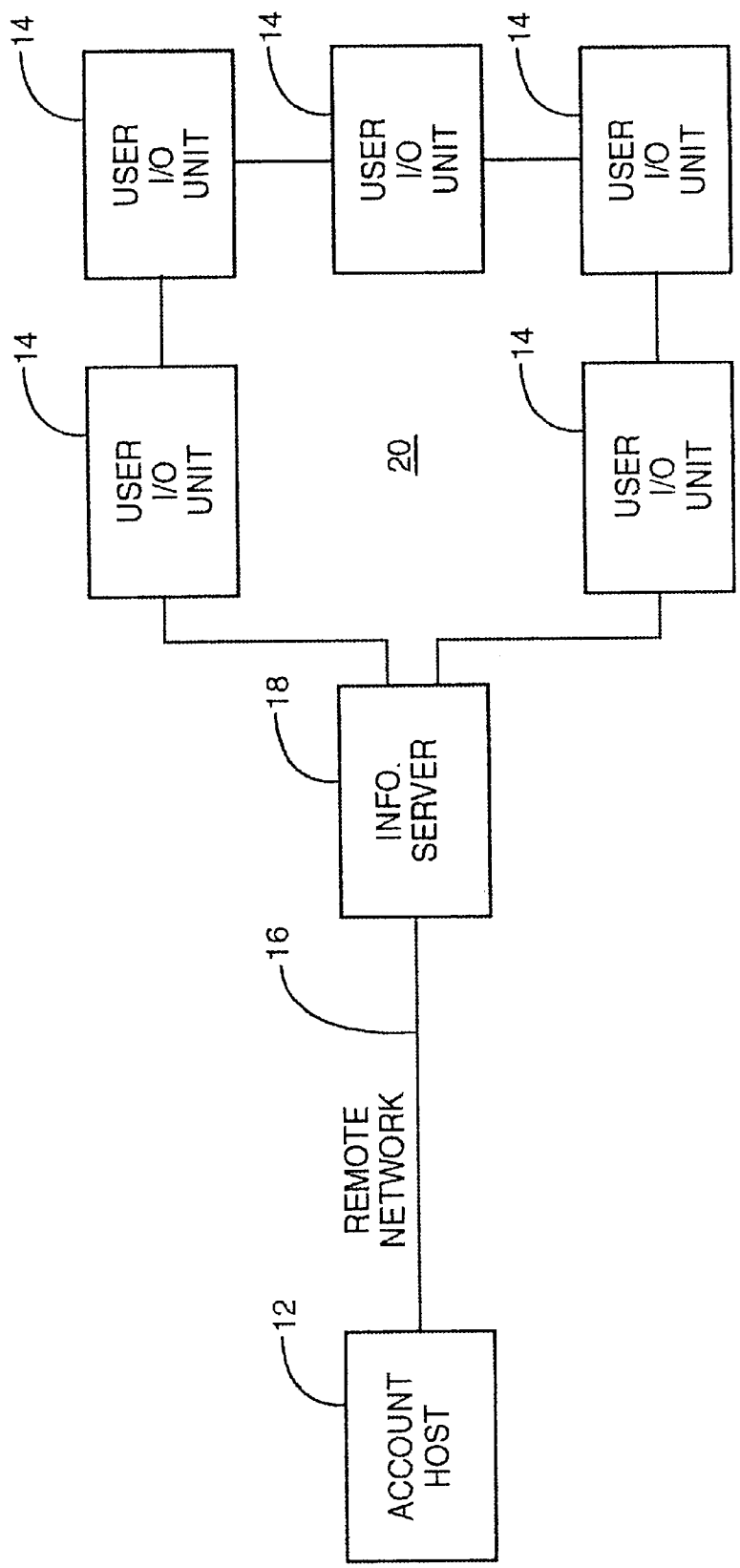

Still another network is seen in FIG. 3, wherein the account host 12 is connected to a local area network (LAN) 20 through an information server 18. The LAN 20 includes a plurality of UIUs 14, which may be connected in a peer-to-peer configuration, or have a dedicated server as is well understood. While not shown in this figure, it should be understood that the account host 12 also has connections to a plurality of other information providers 13 and other account hosts 12, such as is shown in FIG. 2.

Figure 4:
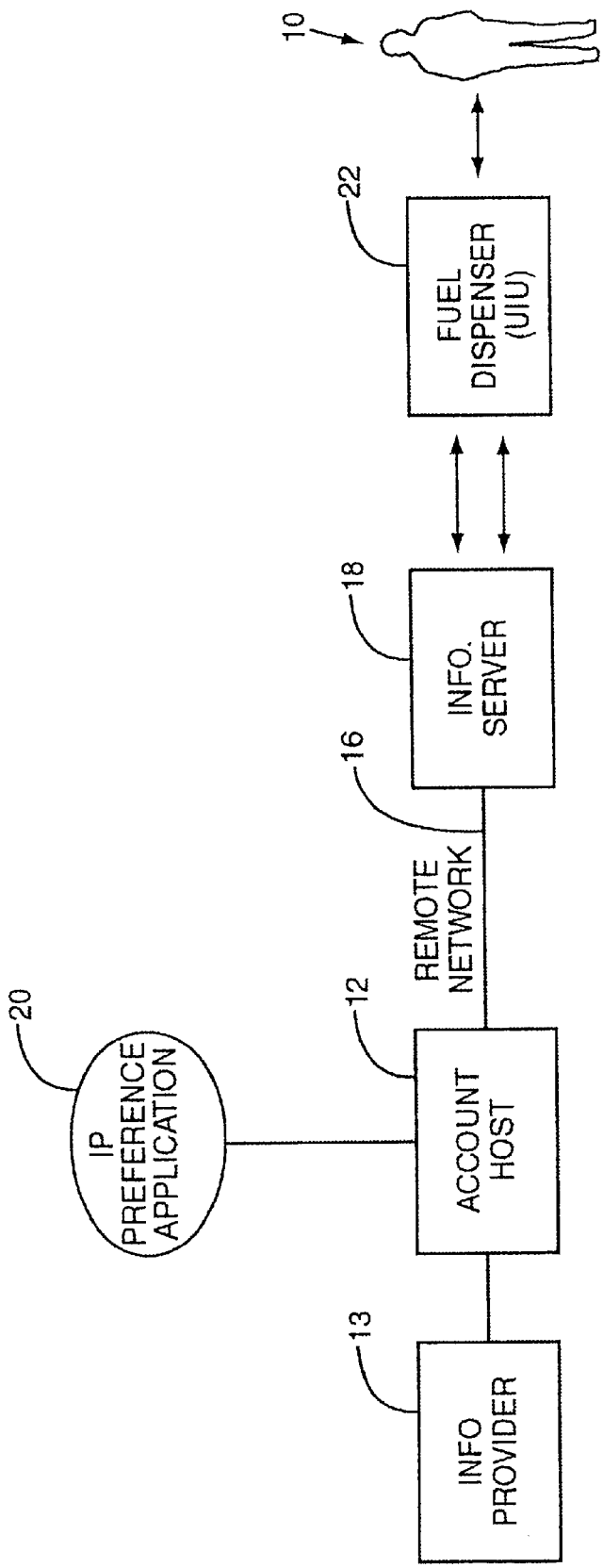
FIGS. 4 is schematic diagram of a first embodiment of the network of the present invention.

The present invention lies in the adaptation of these networks to a retail environment, and specifically in how a user may specify preferences in content to be provided over a POS terminal, preferably in a fuel dispensing environment, which may also include other retail sub-establishments therein, such as a convenience store, a quick serve restaurant and the like. Specifically, as seen in FIG. 4, a user 10 may access content from the account host 12 by means of a UIU 14 integrated into a fuel dispenser 22. One example of such an Internet capable fuel dispenser 22 is disclosed in the previously incorporated U.S. patent application Ser. No. 08/896,988, filed Jul. 18, 1997. The fuel dispenser 22 may be connected to the information server 18 through a direct connection, such as seen in FIGS. 1 and 2, or a LAN, such as LAN 20, shown in FIG. 3. In this manner, the user 10 can get access to content or information provided by the account host 12 or other information providers 13 at a retail outlet. The account host 12 is further equipped with Information Preference Application (IPA) software 20, as further explained below. While preferably installed at the account host 12, the IPA software 20 may be installed at a UIU 14 or at the information server 18.

For all the embodiments disclosed herein, the remote account host 12 may communicate with the UIU 14 or the information server 18 through the use of an appropriate protocol such as HyperText Transfer Protocol (HTTP) or Transfer Control Protocol/Internet Protocol (TCP/IP) or the like. Information may be stored in an HyperText Markup Language (HTML) or other suitable format as required or desired.

Figure 5:
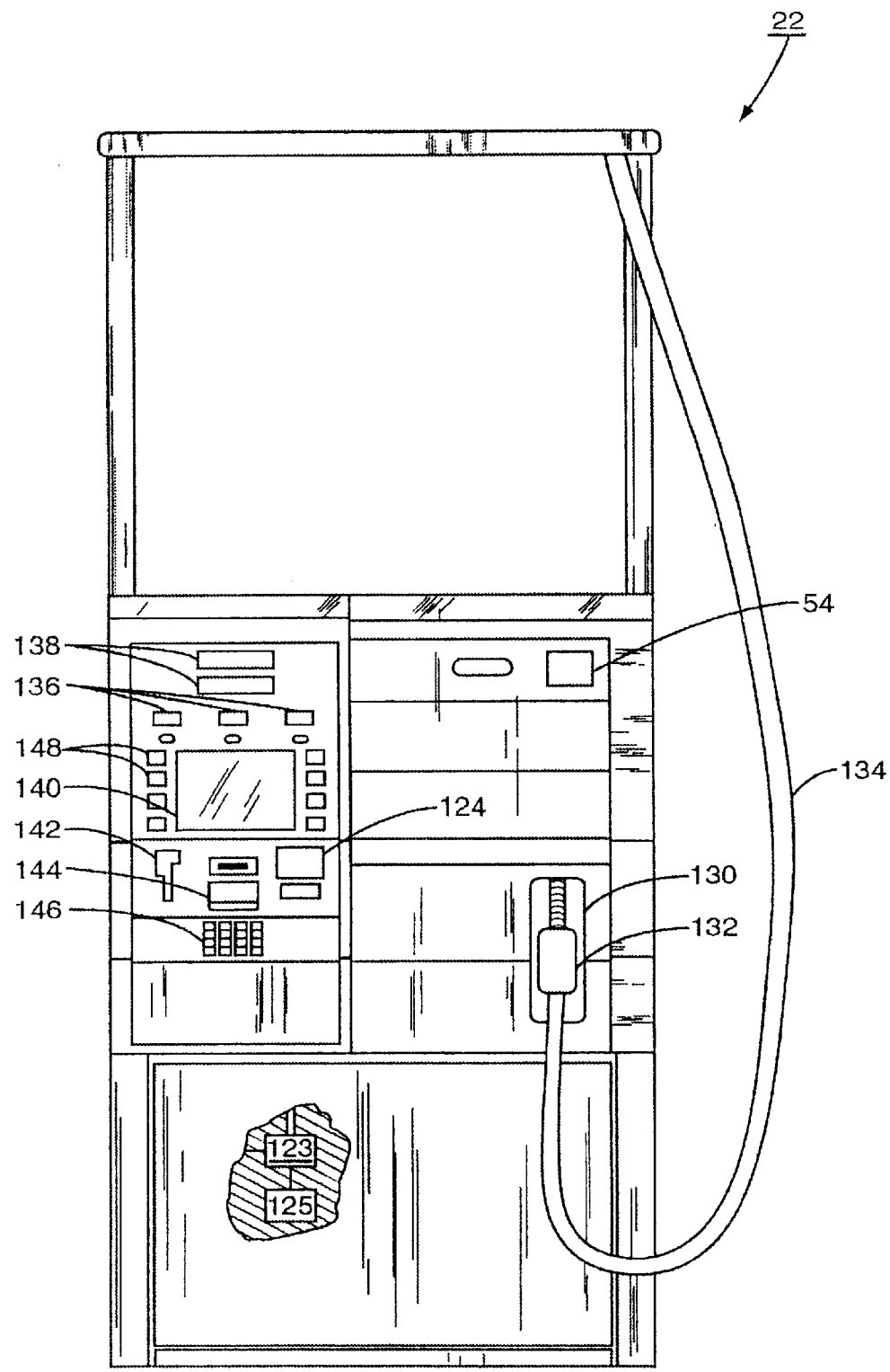
FIG. 5 is a front elevational view of a fuel dispenser adapted for use with the present invention.

A fuel dispenser 22 according to the present invention is seen in FIG. 5. The fuel dispenser 22 includes a conventional nozzle 132, coupled to the fuel dispenser 22 by a conventional hose 134, and resting on a boot 130. A plurality of buttons 136 allow fuel grade selection, while conventional displays 138 provide information such as gallons pumped and price for fuel already pumped. The fuel dispenser 22 also includes a large visual display 140, which is preferably capable of transmitting color images like a television or computer monitor. Additionally, the fuel dispenser includes a printer 124 as well as a magnetic card reader 142, a cash acceptor 144 and additional keypads 146 and 148. Keypad 146 may be an alphanumeric keypad for the entry of a PIN or the like, while keypad 148 is preferably tied to monitor 140 and may make selections therefrom. Monitor 140 may also be a touchscreen, thereby eliminating the need for keypad 148. The fuel dispenser 22 includes a transponder interrogator 54, which will be explained in greater detail below. The fuel dispenser 22 also includes a control system 123 that may be a microprocessor or the like with an attached memory 125. The control system 123 is connected by conventional communication connections to the information server 18 and to the various electrical components within the fuel dispenser 22.

The UIU 14 is formed on the fuel dispenser 22 from the elements of the display 140 and one or more of the keypads 146 and 148. Alternatively, if the monitor 140 is a touchscreen, then the monitor 140 can double as an input device and an output device for the UIU 14 within the dispenser 22. Additionally, the UIU 14 may draw upon the computing power of the control system 123 as needed.

The account host 12 can provide the content on the display 140 during a fueling operation or in response to a request by the user 10. Should the user 10 so desire, the printer 124 may be used to print out portions of the content presently being viewed, such as an advertisement, stock quote, weather report, traffic update, map or email. This printing may be in response to a manual command or occur automatically as a result of the preferences of the present invention (explained below). Since typical fuel dispenser printed 124 are adapted to print out narrow receipts, appropriate software would be include to properly scale the size and shape of the content presently viewable on the display to fit on the paper used for receipts. Alternatively, a more robust printer 124 could be substituted within the fuel dispenser 22, such a printer 124 could handle A4 paper or 8.5×11 inch paper as needed or desired.

Figure 6:
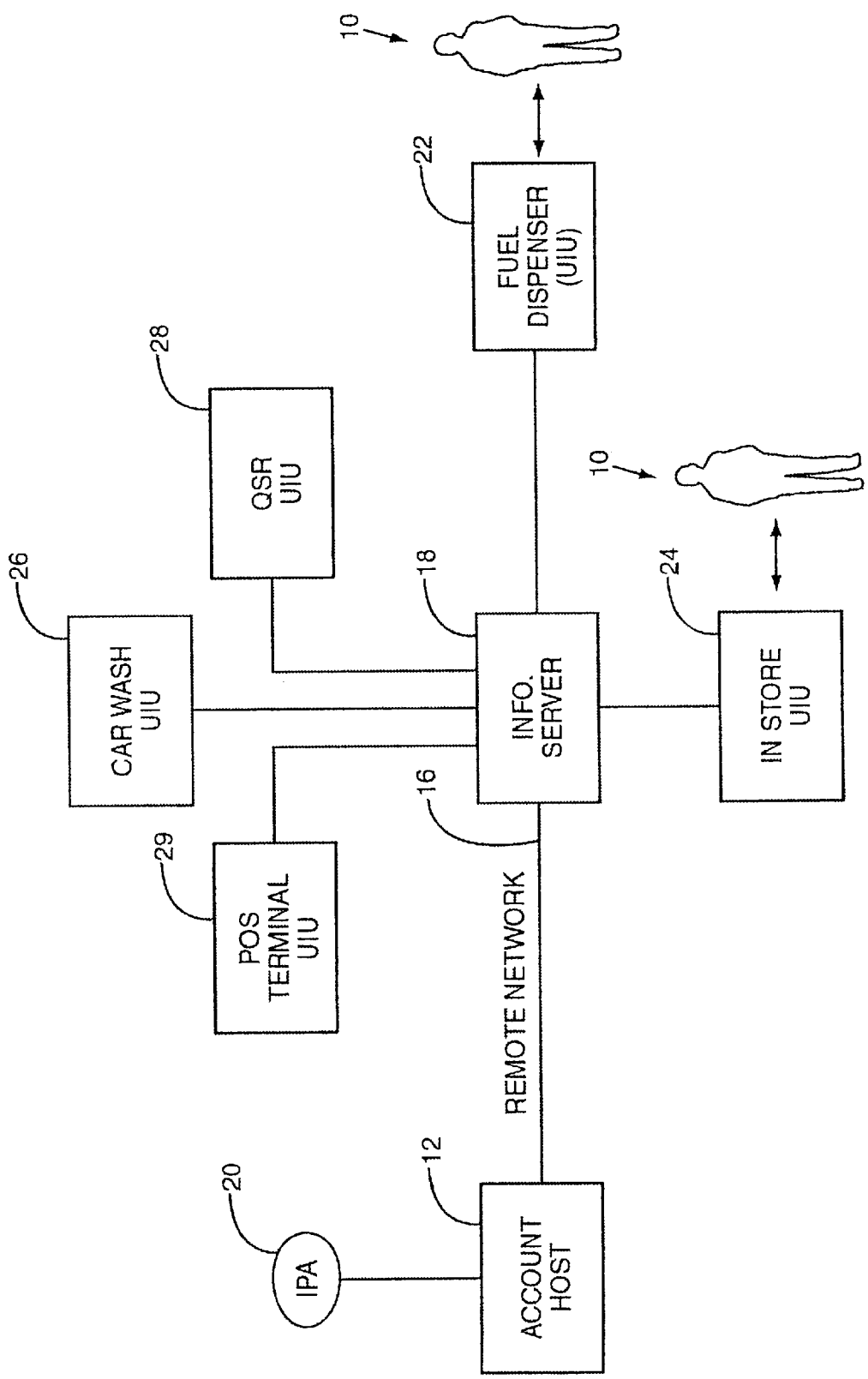
FIG. 6 is a schematic drawing of the present invention as used in a fuel dispensing environment.

An alternate exemplary network implementing the present invention is seen in FIG. 6, where the UIU 14 may be integrated into a number of different terminals. The UIU 14 could be in a fuel dispenser 22, such as the one discussed above, an in-store unit 24, a car wash POS 26, a quick serve restaurant POS 28, or other POS terminal 29. The UIUs 14 may be dedicated terminals (appropriate for the in-store unit 24) or integrated into a POS device (appropriate for the remainder). In this embodiment, the information server 18 is preferably a central site control unit such as the G-SITE®, sold by Gilbarco Inc. of Greensboro, N.C., assignee of the present invention, and may be located within a gas station building (not shown). The information server 18 must route requests for information from each UIU 14 in its network to the appropriate account host 12 and then route data provided by the account host 12 to the appropriate requesting UIU 14. Alternatively, the UIU 14 may have direct access to a phone line or the like for access to the account host 12. This results in the need for additional phone lines at the retail establishment and may increase costs.

Each UIU 14 includes an input device and an output device through which the user 10 may manually interact with the remote account host 12. In this manner, time that would otherwise potentially be wasted is spent accessing content from the remote account host 12. For example, while waiting in the drive-thru of a quick serve restaurant, the user 10 can access content through the UIU 14 of the quick serve restaurant POS 28. As point of sale terminals in fuel dispensing environments become increasingly more sophisticated, the integration of UIU functions therein is less problematic. However, this arrangement would require the user 10 to interact manually with the UIU 14 to select which content is accessed from the remote account host 12. The user 10 would have to log in manually and then point and click on the appropriate links until the desired content is accessed. This manual interaction would be cumbersome, especially when there is little time in which to do the pointing and clicking or when it is difficult to reach out physically and touch the input device. Further, most POS terminals do not have navigational tools conducive to efficient navigation.

Figure 7:
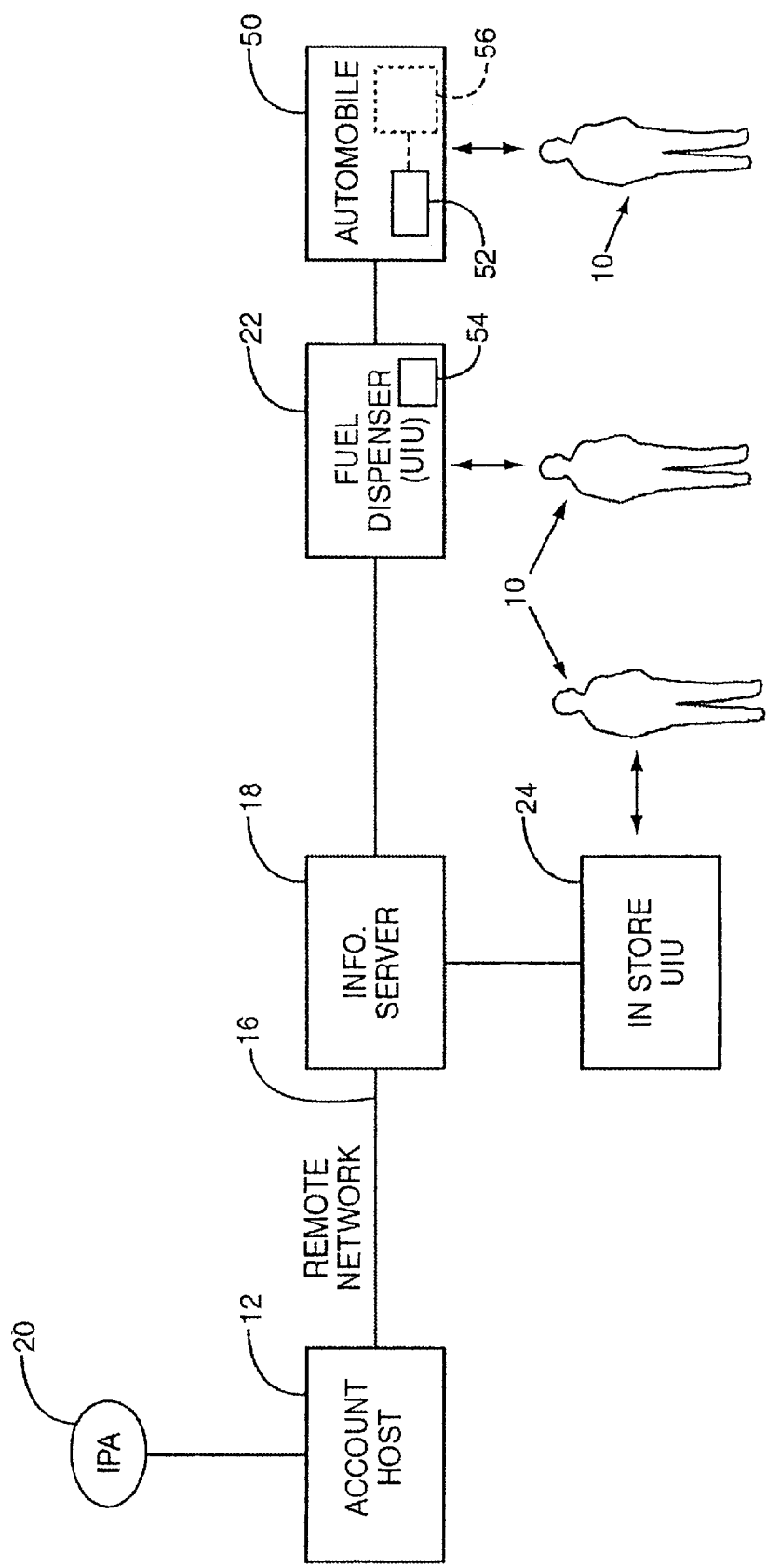
FIG. 7 is an alternate embodiment of the present invention as used in a fuel dispensing environment.

Still another arrangement is seen in FIG. 7, where the UIU 14 may take the form of those previously described, or the user 10 may have access to a UIU 14 within an automobile 50. The vehicle 50 includes a transponder 52, which communicates with the interrogator 54 within a point of sale terminal, such as the fuel dispenser 22. While the words "transponder" and "interrogator" are used, they are meant to be interpreted broadly to include transmitters and receivers, either singly or together as a transceiver. Likewise, transponders and interrogators should allow at a minimum communication, either one way or two-way between each other. In most embodiments, this communication will occur over an RF signal, although optical, acoustic, infrared, ultraviolet and other electromagnetic signals could be used. In one embodiment, data from the account host 12 is routed over the network 16 to the information server 18 and thence to the fuel dispenser 22, where the interrogator 54 broadcasts the data through an RF signal to the transponder 52 in the automobile 50 for viewing therewithin.

In order for the automobile 50 to include a UIU 14 therein, it must include a visual display (not shown) and an input device (not shown) allowing the user to view content from the account host 12 as well as interact therewith. These may be powered from the automobile battery (not shown) or other suitable power source as desired. In one embodiment, the UIU 14 is distinct from the automobile 50, such as where the UIU 14 is a laptop computer 56 that happens to be positioned within the automobile 50. It should be appreciated that while the term "laptop computer" is used, it should be interpreted broadly to include hand held computers and personal digital assistants such as a PALM PILOT™ and the like. In this embodiment, the transponder 52 may be positioned on the laptop 56 rather than the automobile 50 body. In another embodiment, the UIU 14 is integrated into the automobile 50. For example, the display could be in the dashboard and the input device proximate thereto. Other locations, such as the back side of the front passenger seat are also contemplated.

In either embodiment, the user 10 may sit within the automobile 50 and view content from the account host 12 while a retail transaction occurs nearby, such as at the fuel dispenser 22. An alternate embodiment includes the transducer 52 instructing the interrogator 54 to log into the account host 12 and show information therefrom on the dispenser 22. This may be useful not only in the above described embodiment, but also in embodiments wherein the transponder 52 is located in a smart card wielded by the user 10. The smart card would have no display, but could communicate with the dispenser 22 to authorize a fuel purchase and retrieve content as desired. In this case, there is no UIU 14 within the automobile 50, but merely a simpler technique to cause the UIU 14 within the fuel dispenser 22 to show the preferred content. While shown on the dispenser 22, it should be understood that the interrogator 54 could be mounted on any of UIUs 14 which are automobile accessible, such as the car wash POS 26, the QSR POS 28 which may be accessible in the drive-thru, or other retail establishment POS which is automobile accessible.

An additional technique by which the user 10 can access the content preferences includes the use of a conventional debit or credit card. During the authorization process for the transaction, the company responsible for authorizing the transaction may also pass along instructions to provide the desired content. As more and more companies vertically integrate, the possibility that an account host 12 may also act as your bank is more likely, thus making this process more stream-lined. Reference is made to previously incorporated U.S. patent application Ser. No. 09/024,742, which has a discussion of how the user may indicate preferences through, for example, a credit card company.

The retail outlet owner, who wishes to limit the use of his Internet connection, may impose a time limit during which the user 10 may access content. Time limits may also be imposed by the duration of the retail transaction. For example, the content is only accessed while fuel is being dispensed. Concerns also exist about the need to navigate through the Internet manually. If the interface is unfamiliar, time may be wasted entering the appropriate commands which retrieve and display desired content. Furthermore, if the user 10 is engaged in an activity that requires the use of his hands (such as washing his window, holding the nozzle 132, etc.), the user 10 may not be able to enter manually commands to retrieve and display information. Because the user 10 may have limited time to access content, the Information Preference Application (IPA) software 20 provides a way to economize the time that is available as well as eliminating the need for the user 10 to navigate manually between content providers.

Figure 8:
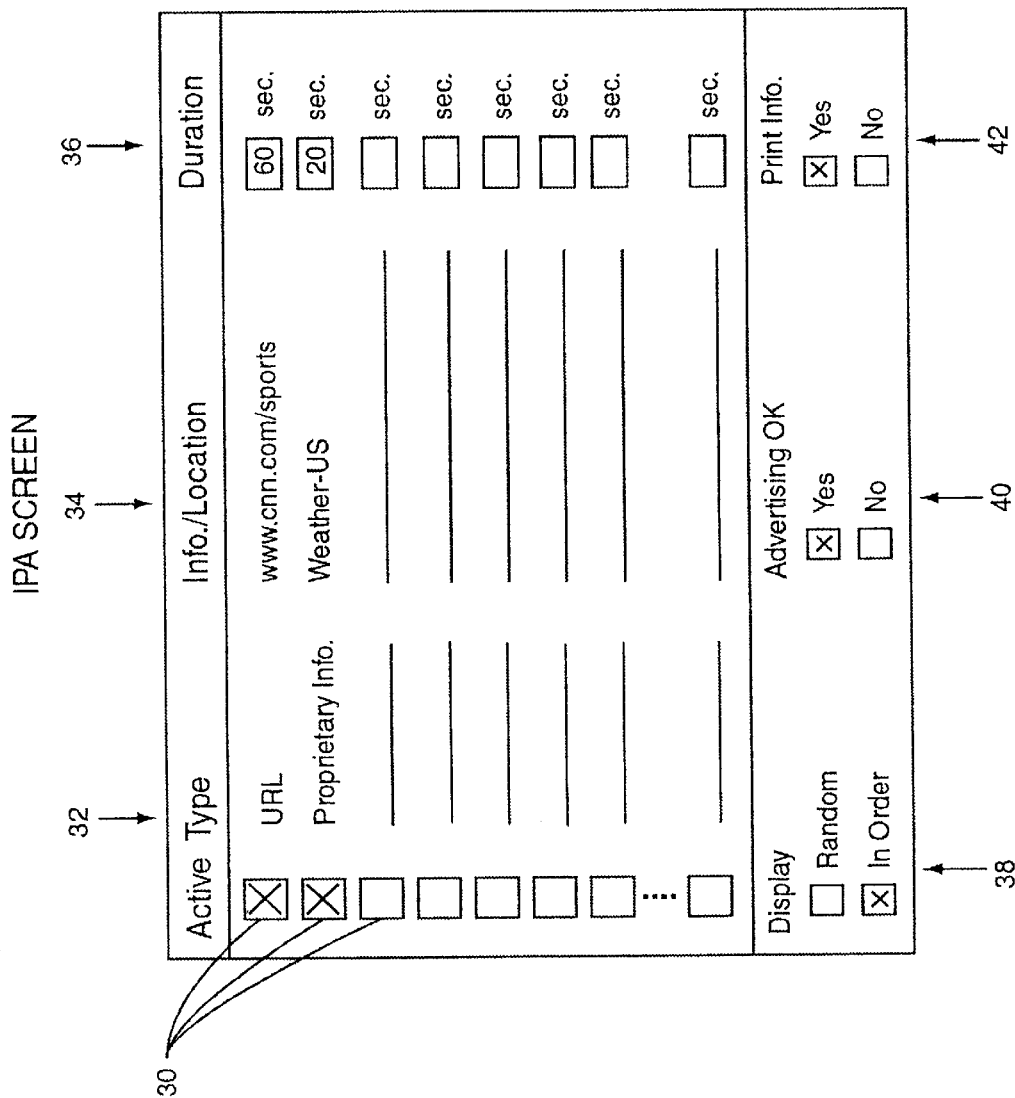
FIG. 8 is a representative illustration of a user interface having a preference template associated with the software of the present invention.

In order to solve this time constraint, the various modules of software 20 are installed in the appropriate locales. One module, the Preference setting module is preferably installed in at the account host 12, although installation at a UIU 14 is also possible. Specifically, it is installed at the account host 12 at whose server, the user 10 has an account. The user 10 may log into the account host 12 from home or through an UIU 14 of the present invention. At the initial log in to the account host 12, the user 10 may be presented with a preference setting template screen such as that seen in FIG. 8, where the user 10 is prompted for different content preferences. Specifically, the user 10 designates one or more particular content providers 12 or 13 as active through the use of a check-box 30 or the like. The "type" of content provider is designated as shown generally at 32. This "type" designation differentiates between content, which is proprietary to the account host 12 from content, which is secured from a remote URL. The location from which the account host 12 is supposed to secure the content is entered, as generally shown at 34. The location is essentially an instruction to the computer where and how to find and retrieve information. As such, it can be a URL, a string of code, or the like, so long as the software is able to interpret the instruction and successfully find and retrieve the information desired. The location may also be an instruction to retrieve email from the account. Furthermore, the duration of the display time for that particular content is designated, as generally shown at 36. Additional choices may be provided to the user 10 through this interface. The contents may be displayed randomly or in the specified order by marking the appropriate check box 38. The user 10 may indicate whether advertising is permissible or acceptable by marking the appropriate check box 40. The user 10 may print the information contained on the interface of the IPA software 20 as generally shown at 42. The print function can take a number of different forms, all of which are contemplated. For example, the print command could print a physical representation of the interface as shown in FIG. 8 so that a user 10 could have a hard copy of the preferences. Alternatively, the user could indicate that the content retrieved at the retail establishment UIU 14 could be printed. This might be appropriate where one of the content providers 13 is the mail server for the user's account.

In general, these "extra" preferences can be performed on a case by case basis. For example, the advertising could be suppressed on only one content provider, but not the others, or the print command could print at the UIU 14 the email of the user 10, but not any of the other content retrieved. Additional commands or preferences may be entered as needed or provided for in the IPA software 20. For example, graphics could be eliminated to reduce download times and further increase the efficiency with which textual information is received.

It is further contemplated that non-Internet information may be accessed, such as local video or advertising of a particular nature, such as in-store specials triggered by the preferences. For example, the user 10 could indicate a preference for non-pork products or Coca-Cola® products. Based on this preference, the software 20 could retrieve and display only specials relating to a particular type of non-pork product such as turkey dogs, or a particular type of Coca-Cola® product such as a MELLOW YELLOW® brand soft-drink.

Figure 9:
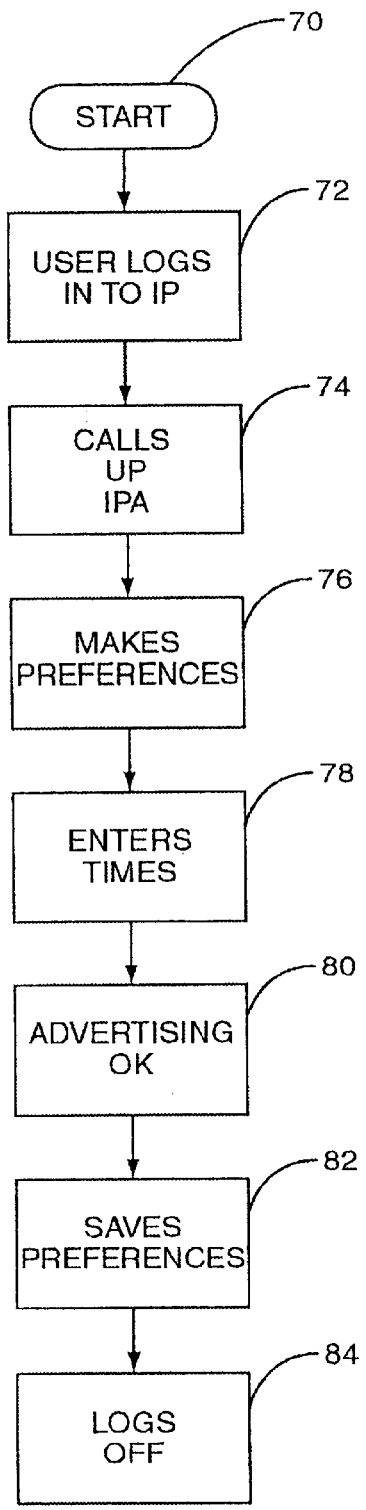
FIG. 9 is a flow diagram of the software used to set the user content preferences.

An example of how the preference selection software module might work is seen in FIG. 9 in a flow chart form. After starting (block 70), the user 10 then logs into the account host 12 containing the information preference application software 20 (block 72). This can be done from home, work or at the retail establishment. The user 10, for example, could install a simple software program which connects the users UIU 14 to the account host 12 automatically and then calls up the IPA 20 (block 74) automatically. If this is not done, the user 10 must manually instruct the UIU 14 to connect to the account host 12 and call up the IPA 20. Alternatively, the IPA 20 may be resident on the UIU 14 and the interface screen called up by activating the program, such as by double clicking on an icon. At this time, the user 10 is presented with the image, or an equivalent, to that shown in FIG. 8. The user 10 enters his preferences (block 76) in terms of which information from desired content providers 12 and 13 is preferred. The user 10 then enters the amount of time each content provider 12 or 13 should be displayed (block 78). Additionally, the user 10 may indicate whether advertising is acceptable (block 80). It should be appreciated that while it is logical to do things in this particular order, it is not so required. For example, the user could indicate his advertising status first, then enter times and finally designate the actual content providers. Likewise, as discussed above the user 10 should have the option to indicate the order or random nature of the presentation of the content and be given a choice to print the preference screen.

Once the preferences are set, they are saved in an appropriate memory device (block 82). The user 10 may log off (block 84) or continue to peruse the content provided by the account host 12. In one embodiment, the preferences are saved in a memory associated with the transponder 52 either in the laptop computer or in the onboard vehicle UIU 14 for later transmission to the retail establishment POS and subsequent retrieval of information based on the transmitted preferences. In another embodiment, the preferences are saved at the account host 12. In still another embodiment, the preferences could be stored in smart card, which includes a transponder 52. The preferences could also be saved in any type of machine accessible memory device in possession of the user 10 and wherein the device can communicate the preferences to the UIU 14 for retrieval and delivery of the content.

In the preferred embodiment, the IPA 20, and particularly the content preference selection module should be accessible from any UIU 14 through which the user 10 can access his account. This multiple access methodology is designed so that the user 10 can change his preferences from any UIU 14 as needed or desired. Thus, it would be possible to change his preferences at the fuel dispenser 22 or any of the other fueling station UIUs 14 as well as from a home personal computer or the like.

Figure 10:
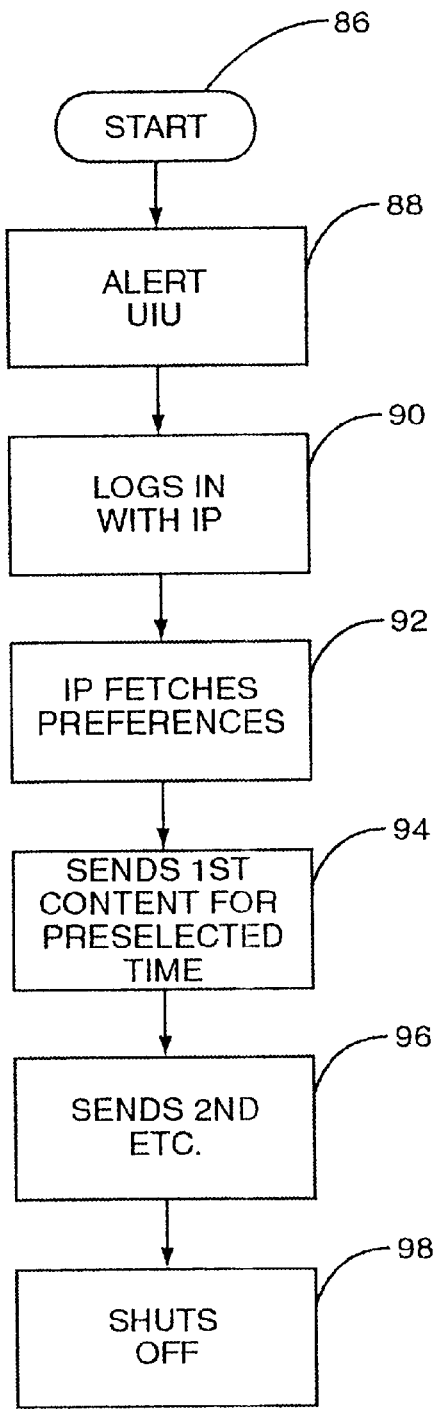
FIG. 10 is a flow diagram of the software used to show the user the results of his or her content preferences.

Once the preferences are saved, they may be recalled at a retail establishment UIU 14 so that the user 10 may view his preferred content providers for the preselected time increments. An example of this is seen in the flow chart of FIG. 10. After the start (block 86), the user 10 alerts the UIU 14 that the user 10 wishes to connect to the account host 12 (block 88). Pressing an appropriate button on the UIU 14 may do this, or it may be done by the presence of the transponder 52 proximate the interrogator 54. Alternatively, the user of a card in the on-site card reader 142 (FIG. 5) may activate the desired sequence. A smart card may also have communication electronics thereon, and the user 10 wave the card in front of the interrogator 54 to start the desired sequence. In the event that a button is pressed, the button could be a button on the fuel dispenser 22 or other POS terminal described above. The user 10 then logs in with his account host 12 (block 90). This may be done using an appropriate input device such as a keyboard or the keypad 146. Since both of these techniques are somewhat time consuming, an alternate technique is that the transponder 52 transmits all the required information automatically to the interrogator 54, which in turn passes the information along to the account host 12. Likewise, when a traditional debit or credit card is used, the information necessary to identify the user may be extracted and used to access the preferences.

After successful connection with the account host 12, the account host 12 activates the IPA 20 and determines the preferences (block 92). Alternately, the transponder 52 may transmit the appropriate preferences and instructions with the log in request. In either event, the account host 12 secures information from the first preferred content provider 12 or 13 and passes it back to the UIU 14 for display thereon. The information is preferably shown for the time indicated by the associated time entered in the preference screen (block 94). After the first content provider 12 or 13 has been displayed the preselected amount of time, information from a second content provider 12 or 13 is secured and passed to the UIU 14 (block 96) and so on until all the preferred content is seen or the information server 18 terminates the connection or the UIU 14 otherwise shuts off (block 98). This may occur for example when the fueling transaction is completed. Not also that the display time does not have to equal the time which the content provider 13 is accessed. For example, the content provider 13 may be accessed for ten second while the content is downloaded, but the content could be viewable or otherwise accessed for a full minute. This would conserve bandwidth requirements and allow multiple information requests to be processed more efficiently.

An alternate embodiment would effectively by-pass the account host 12. In this embodiment, the information server 18 would act as a platform from which to retrieve information on the Internet. In this case, the user just uploads his content preferences to the information server 18 in a format the server 18 can understand and the information server 18 undertakes the job of retrieving information to pass onto the UIU 14. Because this bypasses the account host 12, the IPA software 20 would have to be accessible some other way. For example, smart card owners could receive a software package in the mail which would allow the user 10 to create the preference settings on a home computer and then transfer the preferences to the smart card. Alternatively, the user 10 could fill out a survey and a retail establishment employee enter the preferences. The user 10 could then be sent a transponder 52, a smart card, a login ID, or the like to use at the retail establishment UIUs 14. Once the information server 18 is alerted by the UIU 14 that an authorized user 10 has indicated a desire for content retrieval, the information server 18 could search for and retrieve the desired content.

The actual display of the content may be restricted by the retail establishment. For example, if processed from a fuel dispenser 22, the content may only be displayed while fuel is being dispensed or only when the nozzle 132 is removed from the boot 130. Alternatively, the content may only be displayed after payment authorization and be allowed to run its full cycle as indicated by the number of preferred content providers and the respective times associated therewith. Other variations are well within the scope of this invention. While outside the scope of the control of the user 10, this is the sort of restriction that makes the automatic cycling and the time limits of the present invention particularly useful.

In addition to the automatic cycling performed by the software of the present invention, the software 20 is also adapted to accept user input during the display of the information from the preferred content providers. Thus, a user 10 can interrupt the display of content by pressing an appropriate button on the UIU 14 or turn off the display entirely by pressing another button. Once interrupted, the user 10 can reprogram the preferences by entering the appropriate commands or may manually drive the display by assuming active control over the UIU 14 and instructing it on which content to access and display. This would be performed similarly, if not identically, to a normal browser's functioning. Additional commands such as a "skip" or "advance" command could accelerate the cycling through the predetermined preferences. Additional functions of the software 20 are also contemplated. For example, the user 10 should be able to print his email or the content of the screen presently being viewed at the POS, such as on printer 124.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A system adapted to retrieve information and allow access by a user at a retail establishment according to the user's preselected preferences, said system comprising:
    a) a user input/output including at least a display and an input device;
    b) an information server communicatively coupled to said user input/output unit and to at least two information files;
    c) software for retrieving information from the at least two information files, and showing said information on said display, said software further for receiving user preferences about which of the at least two information files is to be contacted to retrieve information for display; and
    d) wherein said software is adapted to switch automatically between different ones of the at least two information files after a predetermined amount of time, wherein the user programs the predetermined amount of time.

2. The system of claim 1 wherein said user input/output unit is a fuel dispenser.

3. The system of claim 1 further comprising an interrogator communicatively coupled to said information server and a transponder in radio communication with said interrogator, said transponder associated with said user input/output unit.

4. The system of claim 3 wherein said user input/output unit is a computer positioned in an automobile.

5. The system of claim 4 wherein said computer is a laptop computer.

6. The system of claim 4 wherein said computer is integrated into said automobile.

7. The system of claim 1 wherein said user input/output device is integrated in a quick sever restaurant point of sale device.

8. A method of viewing information from preselected content providers, said method comprising the steps of:
    a) passing an alert from a user input/output unit to an information server;
    b) receiving user preferences indicating from which content providers to retrieve information;
    c) receiving user preferences indicating designated display time increments for each content provider;
    d) retrieving the preferred information; and
    e) displaying on the user input/output device the preferred information for the designated times.

9. The method of claim 8 further comprising the step of accessing an account host.

10. The method of claim 8 wherein user preferences are received from an account host.

11. The method of claim 8 wherein user preferences are received from the user input/output device.

12. The method of claim 8 wherein said content providers are displayed in a random order.

13. The method of claim 8 wherein said content providers are displayed in a preselected order.

14. The method of claim 8 further comprising the step of displaying advertising simultaneously with information from the content providers.

15. The method of claim 8 further comprising the step of manually overriding the display of the preselected content.

16. A method of selecting user preferences for content display during a retail transaction, said method comprising the steps of:
    a) designating at least one preferred content provider;
    b) designating a preferred display time for each of said at least one preferred content providers; and
    c) storing in a memory the preferences so designated.

17. The method of claim 16 further comprising the step of indicating the acceptability of advertising.

18. The method of claim 16 wherein designating at least one preferred content provider comprises designating a plurality of preferred content providers.

19. The method of claim 18 further comprising the step of designating the order in which content from said preferred content providers is subsequently shown.

20. The method of claim 18 further comprising the step of designating that content from the preferred content providers is subsequently shown in a random fashion.

21. The method of claim 16 further comprising the step of logging in to an account host to make said designations.

22. The method of claim 21 wherein the preferences so designated are stored in a memory associated with said account host.

23. The method of claim 16 wherein the preferences so designated are stored in a memory associated with a user input/output unit.

24. A computer readable medium containing software for entering user content preferences, said software adapted to:
    a) communicate with an information server a request for retrieval of information;
    b) access preselected preferred content provider designations;
    c) retrieve content from preferred content providers based on the preselected preferred content provider designations; and
    d) display information retrieve from the preferred content providers on a user input/output device;

said software adapted to automatically switch between different ones of the preferred content providers after expiration of a preselected amount of time.

25. The computer readable medium of claim 24 wherein said software is adapted to access preselected preferred content provider designations from an account host.

26. The computer readable medium of claim 24 wherein said software is adapted to be stored in memory associated with a user input/output unit.

27. The computer readable medium of claim 26 wherein said software communicates with the information server at least in part through a transponder and an interrogator.

28. The computer readable medium of claim 24 wherein said software is further adapted to receive a user request for retrieval of information.

29. The computer readable medium of claim 24 wherein the switching is done in a preselected order.

30. The computer readable medium of claim 24 wherein the switching is done in a random fashion.

31. The computer readable medium of claim 24 wherein said software is further adapted to retrieve preferences relating to the acceptability of advertising.

32. The computer readable medium of claim 24 wherein said software is adapted to access preselected preferred content provider designations from a user controlled user input/output unit.

33. A computer readable medium containing software for creating and storing user preferences for content providers for eventual display in a retail environment, said software adapted to:
    a) receive preferred content provider designations;
    b) receive time limits corresponding to display times for each of the preferred content provider designations; and
    c) store the designations and time limits in a memory.

34. The computer readable medium of claim 33 wherein said software is adapted to be run on an account host.

35. The computer readable medium of claim 33 wherein said software is adapted to be run on a user input/output unit.

36. The computer readable medium of claim 33 wherein said software is adapted to accept instruction on the acceptability of advertising.

37. The computer readable medium of claim 33 wherein said software is adapted to accept instruction on the order in which information is retrieved from the preferred content provider designations.

38. The computer readable medium of claim 37 wherein the order is random.

39. The computer readable medium of claim 28 wherein the order is preselected by a user.

40. A method of receiving information at a retail establishment, said method comprising the steps of:
    a) logging into to an account host from a terminal at a retail establishment;
    b) executing a set of predetermined preferences at the account host;
    c) retrieving information according to the predetermined preference; and d) receiving information sent from the account host on the terminal of the retail establishment.

41. The method of claim 40 further comprising the step of prestoring the preferences in a memory associated with the account host.

42. The method of claim 40 wherein retrieving information comprises the step of retrieving information stored in a memory associated with the account host.

43. The method of claim 40 wherein retrieving information comprises the step of retrieving information from a content provider other than the account host.

44. The method of claim 40 wherein retrieving information comprises the step of retrieving information from the account host and a content provider other than the account host.

45. The method of claim 40 further comprising the step of prestoring the preferences in a memory device possessed by a user.

46. A system for creating and viewing content preferences for eventual viewing on a retail establishment terminal, said system comprising:
    a) an account host including a memory device associated therewith;
    b) a remote user operated terminal communicatively coupled to said account host, wherein a user may login to a user account stored in the memory device associated with the account host, said login occurring from said remote user operated terminal and for constructing a set of content preferences; and
    c) a retail establishment including at least one user operated terminal communicatively coupled to said account host, wherein the user may further login to the user account from said at least one user operated terminal at said retail establishment and view content provided according to said content preferences.

47. The system of claim 46 wherein said content is provided by said account host.

48. The system of claim 46 wherein said content is provided by at least one information provider other than said account host.

49. The system of claim 46 wherein said preferences are stored in the memory device associated with said account host.

50. The system of claim 46 wherein said at least one user operated terminal includes a fuel dispenser.

51. A system for creating and viewing content preferences for eventual viewing on a retail establishment terminal, said system comprising:
    a) an account host including a memory device associated therewith, said account host forming part of a dispersed network;
    b) a remote user operated terminal communicatively coupled to said account host, wherein a user may login to a user account stored in the memory device associated with the account host, said login occurring from said remote user operated terminal and for constructing a set of a content preferences; and
    c) a retail establishment including at least one user operated terminal communicatively coupled to said dispersed network, wherein the user may further login to said dispersed network from said at least one user operated terminal at said retail establishment and view content provided according to said content preferences.

52. The system of claim 51 wherein the user logs in to said dispersed network through said account host.

53. A method of setting preferences for later reception of content, said method comprising the steps of:
    a) accessing a preference configuration terminal; and
    b) setting individual time limits which control how long individual content preferences are to be received to a subsequent transaction at point of sale terminal.

54. The method of claim 53 wherein setting preferences is accomplished according to a predefined screen.

55. The method of claim 53 wherein setting preferences comprises the step of setting a time limit which limits the total time the content is displayed.

56. The method of claim 53 wherein setting preferences comprises the step of indicating the acceptability of advertising.

57. The method of claim 53 further comprising the step of printing out a sheet containing set preferences.

58. A point of sale terminal configured to access content according to preferences configured by a customer prior to a transaction wherein said preferences include are selected from a group consisting of: a time limit indicating how long a particular remote content provider is to be accessed; and an order in which a plurality of particular remote content providers are to be accessed.

59. The point of sale terminal of claim 58 further comprising means to print said preferences and means to change said preferences at said point of sale terminal.

60. The point of sale terminal of claim 58 further comprising means to skip preferred content providers.

61. A computer readable medium containing software for entering user content preferences, said software adapted to:

e) communicate with an information server a request for retrieval of information;

f) access preselected preferred content provider designations;

g) retrieve content from preferred content providers based on the preselected preferred content provider designations; and h) display information retrieve from the preferred content providers on a user input/output device;

said software communicates with the information server at least in part though a transponder and an interrogator.

* * * * *